United States Patent
Hayashi

(10) Patent No.: US 7,095,438 B2
(45) Date of Patent: Aug. 22, 2006

(54) IMAGE SIGNAL PROCESSING DEVICE FOR MINIMIZING FALSE SIGNALS AT COLOR BOUNDARIES

(75) Inventor: Kenkichi Hayashi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 801 days.

(21) Appl. No.: 10/150,774

(22) Filed: May 20, 2002

(65) Prior Publication Data

US 2002/0140831 A1    Oct. 3, 2002

Related U.S. Application Data

(62) Division of application No. 09/057,974, filed on Apr. 10, 1998, now Pat. No. 6,456,325.

(30) Foreign Application Priority Data

Apr. 11, 1997  (JP) ................................. 9-93595
Mar. 20, 1998  (JP) ................................. 10-71812

(51) Int. Cl.
  H04N 9/68  (2006.01)
  H04N 9/64  (2006.01)
  H04N 5/21  (2006.01)
  H04N 9/77  (2006.01)

(52) U.S. Cl. .................. 348/237; 348/253; 348/625; 348/663

(58) Field of Classification Search ................ 348/234, 348/235, 237, 241, 252, 253, 625, 663, 666, 348/669, 670, 712
See application file for complete search history.

(56) References Cited

U.S. PATENT DOCUMENTS

| | | | |
|---|---|---|---|
| 4,907,074 A | 3/1990 | Hashimoto | |
| 5,124,787 A | 6/1992 | Lee et al. | |
| 5,202,756 A * | 4/1993 | Sasaki et al. | 348/659 |
| 5,331,411 A | 7/1994 | Kawakami et al. | |
| 5,345,264 A | 9/1994 | Murata et al. | |
| 5,430,499 A | 7/1995 | Asada et al. | |
| 5,510,835 A * | 4/1996 | Nishizawa et al. | 348/242 |

(Continued)

FOREIGN PATENT DOCUMENTS

JP    06125563 A  *  5/1994

(Continued)

*Primary Examiner*—David Ometz
*Assistant Examiner*—John M. Villecco
(74) *Attorney, Agent, or Firm*—Birch, Stewart, Kolasch & Birch, LLP

(57) ABSTRACT

An image signal processing device of the present invention includes an RGB-YC conversion for converting color component signals output from a CCD (Charge Coupled Device) image sensor to luminance signals and components thereof lying in a high frequency range. The luminance signals and their components lying in a high frequency range are fed to a first, a second and a third low pass filter (LPF), respectively. Luminance signals output from a third LPF are fed to an adder while components lying in a high frequency range are fed from the first LPF to a selector. Further, the components output from the second LPF are fed to the selector via a resolution correcting section. The selector selects either one of the two different kinds of components input thereto. The adder adds the luminance signals output from the third LPF and the components selected by the selector and thereby outputs second luminance signals. A false signal reducing section reduces false signals contained in the second luminance signals and appearing at horizontal color boundaries and feeds the resulting luminance signals to a contour correcting section. With this configuration, the device is capable of reducing false signals appearing at horizontal color boundaries.

5 Claims, 14 Drawing Sheets

U.S. PATENT DOCUMENTS

| | | | |
|---|---|---|---|
| 5,528,292 A | | 6/1996 | Ikeda |
| 5,548,330 A | * | 8/1996 | Hieda et al. ................. 348/234 |
| 5,568,193 A | * | 10/1996 | Kawahara ................... 348/266 |
| 5,581,298 A | * | 12/1996 | Sasaki et al. ................ 348/237 |
| 5,581,357 A | * | 12/1996 | Sasaki et al. ................ 348/234 |
| 5,614,947 A | * | 3/1997 | Tanizoe et al. ............. 348/237 |
| 5,638,138 A | | 6/1997 | Hickman |
| 5,701,368 A | | 12/1997 | Jung |
| 5,767,899 A | * | 6/1998 | Hieda et al. ................. 348/235 |
| 5,787,203 A | | 7/1998 | Lee et al. |
| 5,933,540 A | | 8/1999 | Lakshminarayanan et al. |
| 5,966,170 A | * | 10/1999 | Sugiura et al. ............. 348/234 |
| 6,028,971 A | | 2/2000 | Inuiya et al. |
| 6,377,313 B1 | * | 4/2002 | Yang et al. ................. 348/712 |
| 6,380,973 B1 | * | 4/2002 | Kawahara ................... 348/234 |
| 6,456,325 B1 | * | 9/2002 | Hayashi ...................... 348/234 |
| 2002/0047908 A1 | * | 4/2002 | Mise et al. ................. 348/234 |

FOREIGN PATENT DOCUMENTS

| | | | |
|---|---|---|---|
| JP | 406125563 A | | 5/1994 |
| JP | 07212788 A | * | 8/1995 |
| JP | 07336717 A | * | 12/1995 |
| JP | 08009199 A | * | 1/1996 |
| JP | 2000083180 A | * | 3/2000 |

* cited by examiner

Fig. 2

| G00 | R01 | G02 | B03 | G04 | R05 | - - - - | G(M-1)0 | R(M-1)1 | G(M-1)2 | B(M-1)3 | G(M-1)4 | R(M-1)5 | | |
|---|---|---|---|---|---|---|---|---|---|---|---|---|---|---|
| G10 | B11 | G12 | R13 | G14 | B15 | - - - - | | | | | | | | |
| G20 | R21 | G22 | B23 | G24 | R25 | - - - - | | | | | | | | |
| G30 | B31 | G32 | R33 | G34 | B35 | - - - - | | | | | | | | |
| G40 | R41 | G42 | B43 | G44 | R45 | - - - - | | | | | | | | |
| ⋮ | ⋮ | ⋮ | ⋮ | ⋮ | ⋮ | | ⋮ | ⋮ | | | | | | |
| G0(N-1) | R1N | G2(N-1) | R3N | G4(N-1) | | - - - - | G(M-1)(N-1) | B(M-1)N | | | | | | |
| B0N | R1N | B2N | R3N | B4N | | - - - - | | RMN | | | | | | |

(Bottom row labels: GM0, BM1, GM2, RM3, GM4, BM5, RMN, GM(N-1))

Fig. 3

|     | n | n+1 |
|-----|---|-----|
| m-1 | B | G   |
| m   | R | G   |
| m+1 | B | G   |

Fig. 4

|     | n | n+1 |
|-----|---|-----|
| m-1 | G | R   |
| m   | G | B   |
| m+1 | G | R   |

Fig. 5

|     | n | n+1 |
|-----|---|-----|
| m-1 | R | G   |
| m   | B | G   |
| m+1 | R | G   |

Fig. 6

|     | n | n+1 |
|-----|---|-----|
| m-1 | G | B   |
| m   | G | R   |
| m+1 | G | B   |

Fig. 13

|   | n-3 | n-2 | n-1 | n | n+1 | n+2 | n+3 | n+4 |
|---|---|---|---|---|---|---|---|---|
| m-2 | R | G | B | G | R | G | B | G |
| m-1 | B | G | R | G | B | G | R | G |
| m   | R | G | B | G | R | G | B | G |
| m+1 | B | G | R | G | B | G | R | G |
| m+2 | R | G | B | G | R | G | B | G |
| m+3 | B | G | R | G | B | G | R | G |

Fig. 14

|   | n-3 | n-2 | n-1 | n | n+1 | n+2 | n+3 | n+4 |
|---|---|---|---|---|---|---|---|---|
| m-2 | 1 | 0 | 0 | 0 | 1 | 0 | 0 | 0 |
| m-1 | 0 | 0 | 1 | 0 | 0 | 0 | 1 | 0 |
| m   | 1 | 0 | 0 | 0 | 1 | 0 | 0 | 0 |
| m+1 | 1 | 0 | 0 | 0 | 1 | 0 | 0 | 0 |
| m+2 | 0 | 0 | 1 | 0 | 0 | 0 | 1 | 0 |
| m+3 | 1 | 0 | 0 | 0 | 1 | 0 | 0 | 0 |

Fig. 15

|   | n-3 | n-2 | n-1 | n | n+1 | n+2 | n+3 | n+4 |
|---|---|---|---|---|---|---|---|---|
| m-2 | 0.5 | 0 | 0.5 | 0 | 0.5 | 0 | 0.5 | 0 |
| m-1 | 0.5 | 0 | 0.5 | 0 | 0.5 | 0 | 0.5 | 0 |
| m | 0.75 | 0 | 0.25 | 0 | 0.75 | 0 | 0.25 | 0 |
| m+1 | 0.75 | 0 | 0.25 | 0 | 0.75 | 0 | 0.25 | 0 |
| m+2 | 0.5 | 0 | 0.5 | 0 | 0.5 | 0 | 0.5 | 0 |
| m+3 | 0.5 | 0 | 0.5 | 0 | 0.5 | 0 | 0.5 | 0 |

Fig. 16

|   | n-3 | n-2 | n-1 | n | n+1 | n+2 | n+3 | n+4 |
|---|---|---|---|---|---|---|---|---|
| m-2 | 0.25 | 0.25 | 0.25 | 0.25 | 0.25 | 0.25 | 0.25 | 0.25 |
| m-1 | 0.25 | 0.25 | 0.25 | 0.25 | 0.25 | 0.25 | 0.25 | 0.25 |
| m | 0.375 | 0.25 | 0.125 | 0.25 | 0.375 | 0.25 | 0.125 | 0.25 |
| m+1 | 0.375 | 0.25 | 0.125 | 0.25 | 0.375 | 0.25 | 0.125 | 0.25 |
| m+2 | 0.25 | 0.25 | 0.25 | 0.25 | 0.25 | 0.25 | 0.25 | 0.25 |
| m+3 | 0.25 | 0.25 | 0.25 | 0.25 | 0.25 | 0.25 | 0.25 | 0.25 |

Fig. 22

|  | n-3 | n-2 | n-1 | n | n+1 | n+2 | n+3 | n+4 |
|---|---|---|---|---|---|---|---|---|
| m-2 |  |  |  |  |  |  |  |  |
| m-1 |  |  |  |  |  |  |  |  |
| m |  |  |  |  |  |  |  |  |
| m+1 |  |  | 1 |  |  |  | 1 |  |
| m+2 | 1 |  |  |  | 1 |  |  |  |
| m+3 |  |  | 1 |  |  |  | 1 |  |

Fig. 23

|  | n-3 | n-2 | n-1 | n | n+1 | n+2 | n+3 | n+4 |
|---|---|---|---|---|---|---|---|---|
| m-2 | 0 | 0 | 0 | 0 | 0 | 0 | 0 | 0 |
| m-1 | 0 | 0 | 0 | 0 | 0 | 0 | 0 | 0 |
| m | 0 | 0 | 0.25 | 0 | 0 | 0 | 0.25 | 0 |
| m+1 | 0.25 | 0 | 0.5 | 0 | 0.25 | 0 | 0.5 | 0 |
| m+2 | 0.5 | 0 | 0.5 | 0 | 0.5 | 0 | 0.5 | 0 |
| m+3 | 0.5 | 0 | 0.5 | 0 | 0.5 | 0 | 0.5 | 0 |

|  | n-3 | n-2 | n-1 | n | n+1 | n+2 | n+3 | n+4 |
|---|---|---|---|---|---|---|---|---|
| m-2 | 0 | 0 | 0 | 0 | 0 | 0 | 0 | 0 |
| m-1 | 0 | 0 | 0 | 0 | 0 | 0 | 0 | 0 |
| m | 0 | 0.0625 | 0.125 | 0.0625 | 0 | 0.0625 | 0.125 | 0.0625 |
| m+1 | 0.125 | 0.1875 | 0.25 | 0.1875 | 0.125 | 0.1875 | 0.25 | 0.1875 |
| m+2 | 0.25 | 0.25 | 0.25 | 0.25 | 0.25 | 0.25 | 0.25 | 0.25 |
| m+3 | 0.25 | 0.25 | 0.25 | 0.25 | 0.25 | 0.25 | 0.25 | 0.25 |

IMAGE SIGNAL PROCESSING DEVICE FOR MINIMIZING FALSE SIGNALS AT COLOR BOUNDARIES

This application is a divisional application Ser. No. 09/057,974, filed on Apr. 10, 1998 now U.S. Pat. No. 6,456,325, the entire contents of which are hereby incorporated by reference and for which priority is claimed under 35 U.S.C. § 120.

BACKGROUND OF THE INVENTION

1. Field of the Invention

The present invention relates to an image signal processing device for a digital still camera or similar imaging apparatus and, more particularly, to an image signal processing device capable of reducing false signals appearing when the high frequency components of luminance signals are produced from signals output from a CCD (Charge Coupled Device) image sensor on which a G stripe, R/B full checker color filter is fitted.

2. Description of the Background Art

A digital still camera, for example, includes an imaging device implemented as a CCD image sensor. A color filter for separating an R (red), a G (green) and a B (blue) color component pixel by pixel is fitted on the image sensor. Various kinds of color filters are known in the art and include a G stripe, R/B full checker color filter. Considering the noticeable influence of G component signals on resolution, the G stripe, R/B full checker color filter has R filter components, G filter components and B filter components arranged such that a number of G component signals can be detected. For example, the filter components are arranged in a repetitive GRGB pattern. In addition, the filter components are arranged such that the G filter components form vertical stripes while the R filter components and B filter components alternate with each other in the vertical direction. In this condition, the R filter components and B filter components each forms a checker pattern.

An image signal processing device for converting the R, G and B color components output from the above image sensor to luminance signals Y and chrominance signals R-Y and B-Y is conventional. It has been customary with this conventional image signal processing device to determine a luminance signal $Y_L$, a component $Y_H$ of the luminance signal $Y_L$ lying in a high frequency range and chrominance signals R-Y and B-Y for each pixel by using the color component signals of, e.g., a 2 (vertical)×2 (horizontal) pixel matrix including the pixel under observation. Specifically, when the 2×2 pixel matrix including a pixel whose luminance signal should be determined consists of four color component signals R, G1, G2 and B, the luminance signal $Y_L$ is determined by use of a formula 0.3R+0.295(G1+G2)+0.11B.

Further, the component $Y_H$ lying in a high frequency range is produced by a formula (G1+G2)/2 if the color component signal of the pixel whose luminance signal should be determined is a G component signal, or by a formula (R+B)/2 if it is an R or a B component signal. The component $Y_H$ is subtracted from the luminance signal $Y_L$. The resulting difference is passed through a low pass filter to turn out a luminance signal $Y_{L1}$ which is a low frequency component. The component $Y_H$ is added to the luminance signal $Y_{L1}$ so as to output a luminance signal Y implementing a high resolution.

However, the conventional device of the type determining the component of the luminance signal lying in a high frequency range by using two color component signals on two adjoining scanning lines has some problems left unsolved, as follows. When a difference in level between the two color component signals is great at a color boundary between the pixels, a false signal occurs at the color boundary. For example, assume an RB column having the R and B filter components arranged alternately. Then, if a difference in level between the R and B component signals of the adjoining pixels is great, the value of the component $Y_H$ derived from the formula (R+B)/2 noticeably differs from the original value and turns out a false signal.

Moreover, a false signal ascribable to the fold of the high frequency component of the component $Y_H$ of the luminance signal causes a vertical stripe to appear in an image. It is a common practice to reduce this kind of false signals by passing the components $Y_H$ of the luminance signals through a low pass filter so as to reduce the frequency components lying in the high frequency range. This, however, cannot be done without deteriorating the resolution of an image. It is therefore difficult to reduce vertical stripes while guaranteeing a desired resolution.

SUMMARY OF THE INVENTION

It is therefore an object of the present invention to provide an image signal processing device capable of generating an image signal containing a minimum of false signals at color boundaries without deteriorating a resolution.

In accordance with the present invention, an image signal processing device including a solid state imaging device on which a G stripe, RIB full checker color filter is fitted includes a generating circuit for generating, based on color component signals output from the solid state imaging device, first luminance signals and components of the first luminance signals lying in a high frequency range. A low pass filter (LPF) reduces high frequency components of the components lying in a high frequency range and output from the generating circuit to thereby output reduced high frequency components. A resolution correcting circuit increases the reduced high frequency components to thereby output increased high frequency components. An adder adds the increased high frequency components and first luminance signals to thereby output second luminance signals.

Also, in accordance with the present invention, an image signal processing device including a solid state imaging device on which a G stripe, R/B full checker color filter is fitted includes a generating circuit for generating, based on color component signals output from the solid imaging device, first luminance signals and components of the first luminance signals lying in a high frequency range. A first LPF reduces high frequency components of the components output from the generating circuit and lying in a high frequency range to thereby output first reduced high frequency components. A resolution correcting circuit increases the reduced high frequency components to thereby output increased high frequency components. A second LPF reduces high frequency components of the components output from the generating circuit more than the first LPF to thereby output second reduced high frequency components. A selecting circuit selects either the second reduced high frequency components or the increased high frequency components. An adder adds the increased high frequency components and first luminance signals to thereby output second luminance signals.

BRIEF DESCRIPTION OF THE DRAWINGS

The objects and features of the present invention will become more apparent from the consideration of the following detailed description taken in conjunction with the accompanying drawings in which:

FIG. 2 shows the arrangement of color component signals output from a CCD image sensor included in the embodiment;

FIG. 3 shows a part of the color component signals output from the CCD image sensor;

FIG. 4 shows another part of the color component signals output from the CCD image sensor;

FIG. 5 shows still another part of the color component signals output from the CCD image sensor;

FIG. 6 shows a further part of the color component signals output from the CCD image sensor;

FIG. 13 shows a part of the arrangement of a color filter fitted on the CCD image sensor shown in FIG. 1;

FIG. 14 shows the arrangement of color component signals output from the CCD image sensor when red light and blue light are respectively incident to the upper half and lower half of the color filter of FIG. 13;

FIG. 15 shows the arrangement of components lying in a high frequency range and output from an RGB-YC converting section included in the embodiment and corresponding to the color component signals shown in FIG. 14;

FIG. 16 shows the arrangement of components lying in a high frequency range output from the low pass filter having the characteristic of FIG. 10 and corresponding to the color component signals shown in FIG. 15;

FIG. 22 shows the arrangement of color component signals output from the CCD image sensor when light is not incident to the upper half of the color filter of FIG. 13 while red light is incident to the lower half of the same;

FIG. 23 shows the arrangement of components lying in a high frequency range and output from the RGB-YC converting section and corresponding to the color component signals shown in FIG. 22;

DESCRIPTION OF THE PREFERRED EMBODIMENTS

Figure 1:
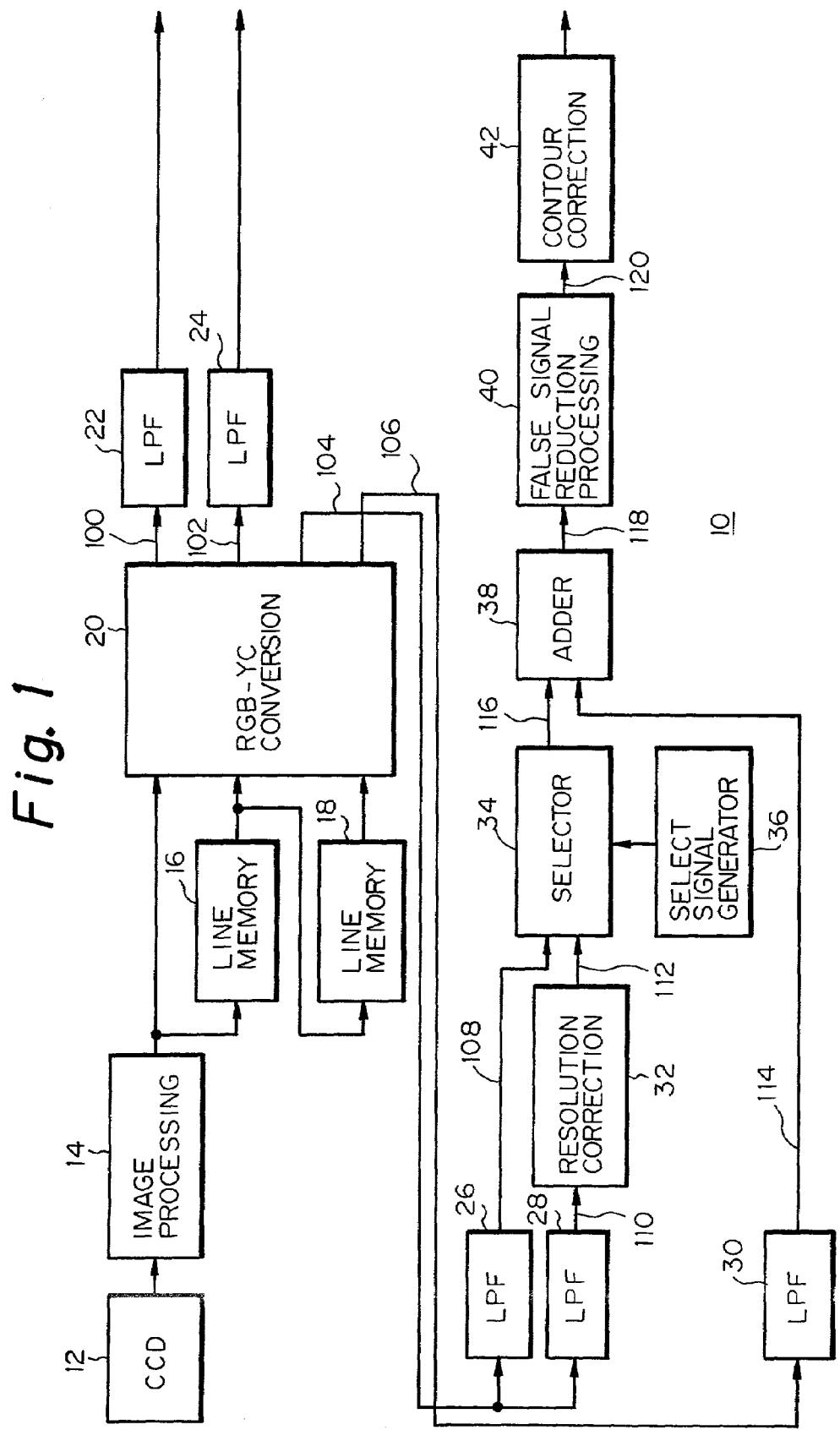
FIG. 1 is a block diagram schematically showing an image signal processing device embodying the present invention.

Referring to FIG. 1 of the drawings, an image signal processing device embodying the present invention is shown and generally designated by the reference numeral 10. As shown, the image signal processing device 10 includes a CCD image sensor or solid state imaging device 12. The image sensor 12 includes a bidimensional light-sensitive portion having several ten thousand to several hundred thousand pixels. A G stripe, R/B full checker color filter is fitted on the image sensor 12. In a specific configuration of the color filter, R, G and B filter components transmitting R, G and B color components, respectively, are arranged in a repetitive GRGB pattern on odd lines and arranged in a repetitive GBGR pattern on even lines. In this configuration, the G filter components extend vertically in the form of stripes while the R and B filter components form a checker pattern. Each of R, G and B color filter components corresponds to a single pixel.

When an optical image is focused to the light-sensitive portion of the image sensor 12 via the color filter, the image sensor 12 transforms it into color component signals pixel by pixel. Then, the image sensor 12 scans the consecutive lines horizontally in order to read and output the pixel-by-pixel color component signals. FIG. 2 shows the spatial arrangement of the color component signals each corresponding to a particular pixel. In FIG. 2, G, R and B are representative of G component signals, R component signals, and B component signals, respectively.

As shown in FIG. 1, the image sensor 12 is connected to an image processing 14. The image processing 14 executes white balance correction, gamma correction and other conventional processing with the color component signals output from the CCD 12. An analog-to-digital converter, not shown, is included in the image processing 14 and converts the processed color component signals to digital signals.

The image processing 14 is connected to a line memory 16 and an RGB-YC conversion 20. The line memory 16 is connected to another line memory 18 and the RGB-YC conversion 20. The line memory 18 is also connected to the RGB-YC conversion 20. The line memories 16 and 18 play the role of delay circuits implemented by shift registers, and each delays the input color comonent signals by a period of time corresponding to a single scanning line. As a result, color component signals currently output from the image sensor 12, color component signals output from the image sensor 12 one scanning line before, and color component signals output from the image sensor 12 two scanning lines before are input to the RGB-YC conversion 20 in parallel.

The RGB-YC conversion 20 transforms the input color component signals to pixel-by-pixel luminance signals $Y_L$, high frequency components $Y_H$ of the luminance signals $Y_L$, and chrominance signals R-Y and B-Y. To produce the signals $Y_L$, $Y_H$, R-Y and B-Y, use may be made of equations taught in, e.g., Japanese patent laid-open publication No. 166987/1990. The illustrative embodiment produces the above signals by using a six-pixel matrix of R, G and B component signals, i.e., three pixels and two pixels arranged vertically and horizontally, respectively. Specifically, assume a pixel (m, n) existing on the row m and column n. Then, when the color component signals corresponding to the pixels (m−1, n), (m−1, n+1), (m, n), (m, n+1), (m+1, n) and (m+1, n+1) appear in a condition shown in FIG. 3, the high frequency component $Y_{Hmn}$ of the pixel (m, n) is produced by:

$$Y_{Hmn} = 0.5 R_{mn} + 0.25(B_{(m-1)n} + B_{(m+1)n}) \quad (1)$$

When the color component signals corresponding to the above pixels appear in a condition shown in FIG. 4 or 6, the high frequency component $Y_{Hmn}$ is produced by:

$$Y_{Hmn} = 0.5 G_{mn} + 0.25(G_{(m-1)n} + G_{(m+1)n}) \quad (2)$$

Further, when the color component signals appear in a condition shown in FIG. 5, the high frequency component $Y_{Hmn}$ is produced by:

$$Y_{Hmn} = 0.5 B_{mn} + 0.25(R_{(m-1)n} + R_{(m+1)n}) \quad (3)$$

The luminance signal $Y_{Lmn}$ corresponding to the pixel (m, n) is determined, as follows. When the color component signals corresponding to the pixels (m−1, n), (m−1, n+1), (m, n), (m, n+1), (m+1, n) and (m+1, n+1) appear in the condition shown in FIG. 3, the luminance signal $Y_{Lmn}$ is produced by:

$$Y_{Lmn} = 0.3 R_{mn} + 0.7 G_{m(n+1)} - 0.055(G_{(m-1)(n+1)} + G_{(m+1)(n+1)}) + 0.055(B_{(m-1)n} + B_{(m+1)n}) \quad (4)$$

When the color component signals appear in the condition shown in FIG. 4, the luminance signal $Y_{Lmn}$ is produced by:

$$Y_{Lmn} = 0.15(R_{(m-1)(n+1)} + R_{(m+1)(n+1)}) + 0.89 G_{mn} - 0.15(G_{(m-1)n} + G_{(m+1)n}) + 0.11 B_{m(n+1)} \quad (5)$$

When the color component signals appear in the condition shown in FIG. 5, the luminance signal $Y_{Lmn}$ is produced by:

$$Y_{Lmn} = 0.15(R_{(m-1)n} + R_{(m+1)n}) + 0.89 G_{m(n+1)} - 0.15(G_{(m-1)(n+1)} + G_{(m+1)(n+1)}) + 0.11 B_{mn} \quad (6)$$

Further, when the color component signals appear in the condition shown in FIG. 6, the luminance signal $Y_{Lmn}$ is produced by:

$$Y_{Lmn} = 0.3 R_{m(n+1)} + 0.7 G_{mn} - 0.055(G_{(m-1)n} + G_{(m+1)n}) + 0.055(B_{(m-1)(n+1)} + B_{(m+1)(n+1)}) \quad (7)$$

On the other hand, when the color component signals corresponding to the pixels (m−1, n), (m−1, n+1), (m, n), (m, n+1), (m+1, n) and (m+1, n+1) appear in the condition shown in FIG. 3, the chrominance components $(R-Y)_{mn}$ and $(B-Y)_{mn}$ corresponding to the pixel (m, n) are respectively produced by:

$$(R-Y)_{mn} = 0.7 R_{mn} - 0.7 G_{m(n+1)} + 0.055(G_{(m-1)(n+1)} + G_{(m+1)(n+1)}) - 0.055(B_{(m-1)n} + B_{(m+1)n}) \quad (8)$$

$$(B-Y)_{mn} = -0.3 R_{mn} + 0.3 G_{m(n+1)} - 0.445(G_{(m-1)(n+1)} + G_{(m+1)(n+1)}) + 0.445(B_{(m-1)n} + B_{(m+1)n}) \quad (9)$$

The chrominance components $(R-Y)_{mn}$ and $(B-Y)_{mn}$ can be determined in exactly the same manner even when the color component signals corresponding to the pixels (m−1, n), (m−1, n+1), (m, n), (m, n+1), (m+1, n) and (m+1, n+1) occur in any one of the conditions shown in FIGS. 4–6.

By using the above equations. (1)–(9), the RGB-YC conversion 20 sequentially outputs the luminance signal ($Y_L$) 106, high frequency component ($Y_H$) 104 of the luminance signal $Y_L$ and chrominance signals (R-Y) 100 and (B-Y) 102 for each of the pixels of the image sensor 12.

The RGB-YC conversion 20 is connected to LPFs 22, 24, 26, 28 and 30. The LPF 22 lowers the frequency components of the chrominance signals (R-Y) 100 output from the conversion 20 and lying in the high frequency range. Likewise, the LPF 24 lowers the frequency components of the chrominance signals (B-Y) 102 output from the conversion 20 and lying in the high frequency range. The LPFs 26 and 28 lower the frequency components of the high frequency components ($Y_H$) 104 output from the conversion 20 and lying in the high frequency range. Further, the LPF 30 lowers the frequency components of the luminance signal ($Y_L$) 106 output from the conversion 20 and lying in the high frequency range.

The LPFs 26 and 28 are connected to a selector 34 and a resolution correction 32, respectively. The resolution correction 32 functions inversely to the LPF 28, i.e., raises the frequency components lying in the high frequency range. More specifically, the resolution correction 32 increases the frequency components of high frequency components ($Y_{H2}$) 110 lowered by the LPF 28 and lying in the high frequency range, thereby preventing the resolution of the image from decreasing. The resolution correction 32 is connected to the selector 34. The selector 34 selects either higher frequency components ($Y_{H1}$) 108 output from the LPF 26 or high frequency components ($Y_{H3}$) 112 output from the resolution correction 32 in accordance with a control signal output from a select signal generator 36.

The LPF 30 and selector 34 are connected to an adder 38. The adder 38 adds a luminance signal ($Y_{L1}$) 114 output from the LPF 30 and a high frequency component ($Y_{H4}$) 116 selected by the selector 34 and thereby produces a luminance signals (Y) 118. This successfully improves the resolution of an image. The adder 38 is connected to a false signal reduction processing 40. The false signal reduction processing 40 filters the luminance signal (Y) 118 output from the adder 38 in order to reduce false signals appearing at horizontal color boundaries.

Figure 7:
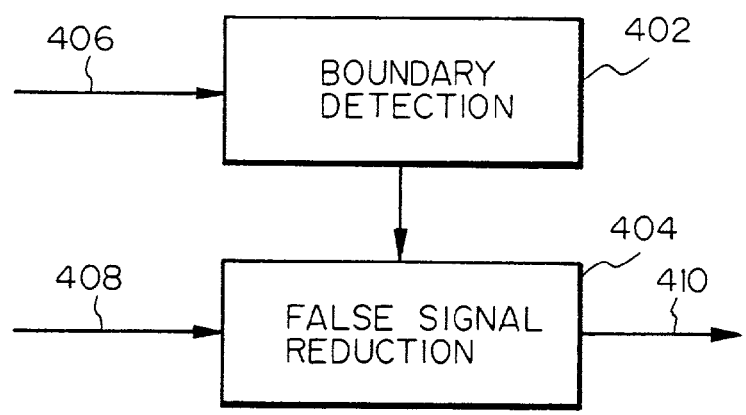
FIG. 7 is a block diagram schematically showing a specific configuration of a false signal reduction processing section included in the embodiment.

FIG. 7 shows a specific configuration of the false signal reduction processing 40. As shown, the false signal reduction processing, labeled 400, is made up of a boundary detection 402 and a false signal reduction 404. The boundary detection 402 detects horizontal color boundaries out of R, G and B component signals 402 output from the image sensor 12. When the boundary detection 402 detects a horizontal color boundary, the false signal reduction 404 reduces false signals appearing at the boundary contained in the luminance signals (Y) 408. When the boundary detection 402 does not detect any horizontal color boundary, the false signal reduction 404 simply outputs the luminance signals (Y) 408 input thereto. The luminance signals output from the false signal reduction 404 are designated by the reference numeral 410.

Figure 8:
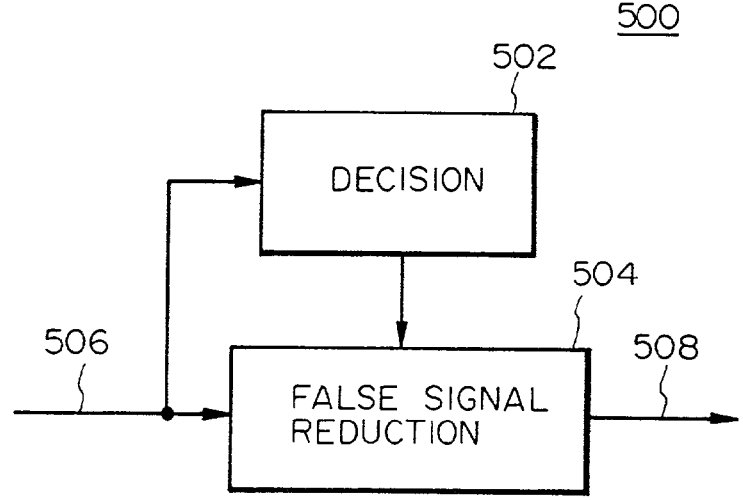
FIG. 8 is a block diagram schematically showing another specific configuration of the false signal reduction processing section.

FIG. 8 shows another specific configuration of the false signal reduction processing 40. As shown, the false signal reduction processing, labeled 500, is made up of an decision 502 and a false signal reduction 504. The decision 502 identifies a horizontal color boundary on the basis of a pattern in which the levels of luminance signals (Y) 506 sequentially input vary. When the decision 502 identifies a horizontal color boundary, the false signal reduction 504 reduces false signals appearing at the boundary contained in the luminance signals (Y) 506 and outputs the resulting luminance signals. When the decision 502 does not identify any boundary, the false signal reduction 504 simply outputs the input luminance signals (Y) 506. The luminance signals output from the false signal reduction 504 are designated by the reference numeral 508.

Referring again to FIG. 1, the false signal reduction 40 is connected to a contour correction 42. The contour correction 42 executes contour correction with the luminance signals output from the false signal reduction 40.

In operation, the CCD image sensor 12 generates RGB color component signals and feeds them to the image processing 14. Specifically, in FIG. 2, the image sensor 12 sequentially outputs the color component signals from the top row to the bottom row and from the left column to the right column. The image processing 14 executes white balance correction, gamma correction and other conventional processing with the color component signals output from the image sensor 12. The image processing 14 digitizes the processed color component signals with a digital-to-analog converter included therein and feeds the resulting digital signals to the line memory 16 and RBG-YC conversion 20.

The line memory 16 delays the color component signals received from the image processing 14 by a period of time corresponding to a single scanning line and delivers the delayed signals to the line memory 18 and RGB-YC conversion 20. The line memory 18 further delays the input delayed color component signals by the above period of time and feeds the delayed signals to the RGB-YC conversion 20. Consequently, the color component signals currently output from the image sensor 12, the color component signals input one scanning line before and the color component signals input two lines before are applied to the RGB-YC conversion 20 in parallel.

The RGB-YC conversion 20 generates, by using the equations. (1)–(9), a luminance signals ($Y_L$) 106, a high frequency component ($Y_H$) 104 of the luminance signal $Y_L$ and chrominance signals (R-Y) 100 and (B-Y) 102 pixel by pixel. The conversion 20 feeds the chrominance signal (R-Y) 100 to the LPF 22, feeds the chrominance signal (B-Y) 102 to the LPF 24, feeds the high frequency component ($Y_H$) 104 to the LPFs 26 and 28, and feeds the luminance signal ($Y_L$) 106 to the LPF 30.

Figure 9:
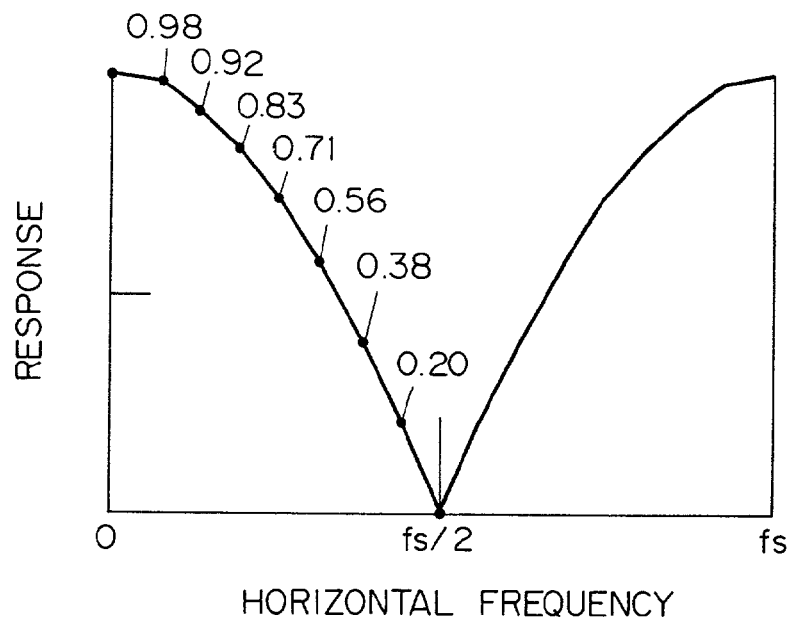
FIG. 9 is a graph showing a specific characteristic of a low pass filter included in the embodiment.

The LPF 22 lowers the frequency components of the input chrominance signals (R-Y) 100 lying in the high frequency range while the LPF 24 lowers the frequency components of the input chrominance signals (B-Y) 102 lying in the high frequency range. Further, the LPF 26 lowers the frequency components of the input high frequency components ($Y_H$) 104 lying in the high frequency range and feeds the lowered frequency components to the selector 34. FIG. 9 shows a specific characteristic of the LPF 26; the ordinate and abscissa indicate a response and a horizontal frequency, respectively. By using an input high frequency component $Y_H(x)$ and a high frequency component $Y_H(x+dx)$ immediately following it, the LPF 26 generates a high frequency component ($Y_{H1}$) 108 satisfying an equation:

$$Y_{H1}=0.5Y_H(x)+0.5Y_H(x+dx) \qquad (10)$$

The LPF 26 therefore serves as an LPF having a cut-off frequency of $f_s/2$ where $f_s$ denotes the sampling frequency of the image sensor 12. Specifically, the LPF 26 reduces the frequency components of the high frequency components ($Y_H$) 104 output from the RGB-YC conversion 20 and lying in the high frequency range As a result, false signals appearing at diagonal or oblique color boundaries contained in the high frequency components ($Y_H$) 104 are reduced to, in turn, reduce vertical stripes at the above boundaries. It is to be noted that the LPF 26 reduces the frequency components in the high frequency range only to such a degree that a preselected resolution is guaranteed.

Figure 10:
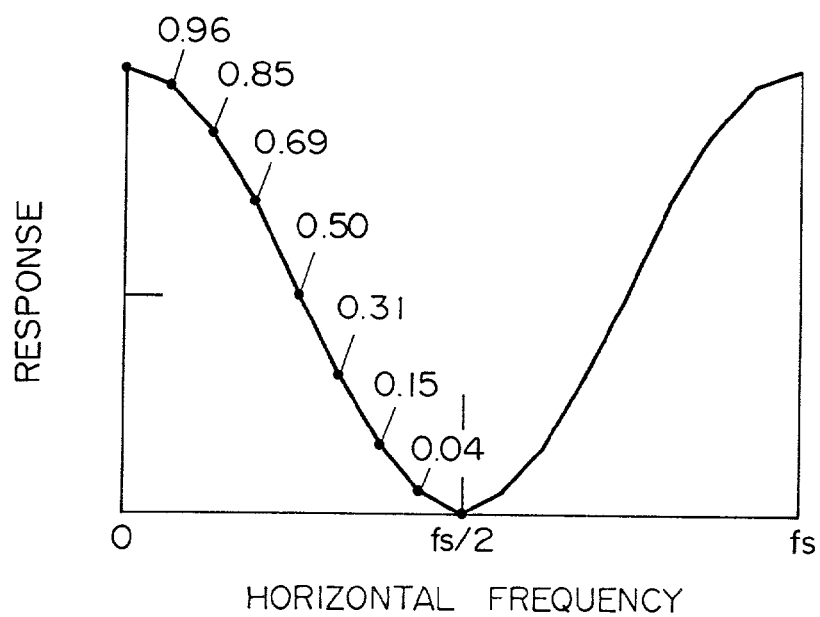
FIG. 10 is a graph showing a specific characteristic of another low pass filter also included in the embodiment.

The LPF 28 reduces the frequency components of the high frequency components ($Y_H$) 104 output from the RGB-YC conversion 20 and lying in the high frequency range and feeds the resulting components to the resolution correction 32. FIG. 10 shows a specific characteristic of the LPF 28; the ordinate and abscissa indicate a response and a horizontal frequency, respectively. By using an input high frequency component $Y_H(x)$, a high frequency component $Y_H(x-dx)$ immediately preceding component $Y_H(xd)$, and a high frequency component $Y_H(x+dx)$ immediately following the component $Y_H(xd)$, the LPF 28 generates a high frequency component ($Y_{H2}$) 110 satisfying an equation:

$$Y_{H2}=0.25Y_H(x-dx)+0.5Y_H(x)+0.25Y_H(x+dx) \qquad (11)$$

The LPF 28 therefore serves as an LPF having a cut-off frequency of $f_s/2$. As for the high frequency range, the LPF 28 has a lower response than the LPF 26 having the specific characteristic shown in FIG. 9. It follows that the LPF 28 is capable of reducing false signals causative of vertical stripes at diagonal color boundaries more positively than the LPF 26.

Figure 11:
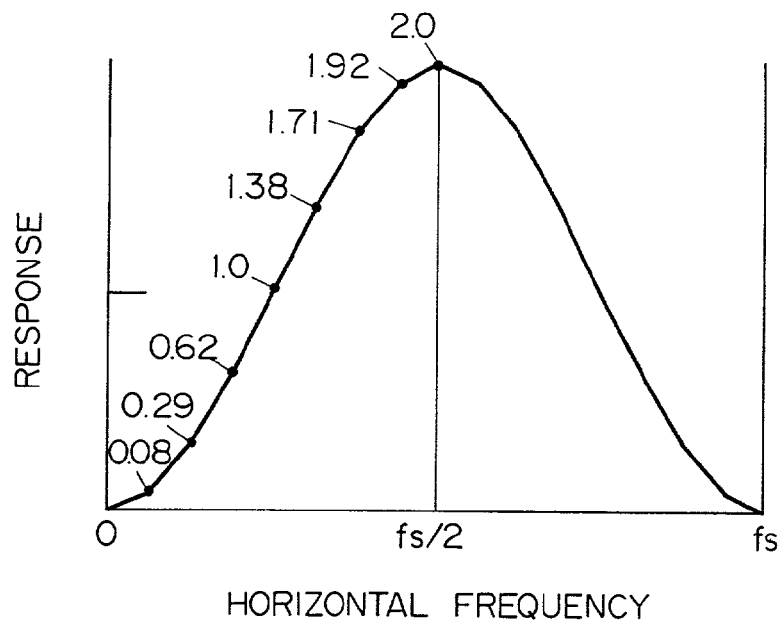
FIG. 11 is a graph showing the processing characteristic of a resolution correcting section included in the embodiment.

However, the problem is that the resolution of an image decreases with an increase in the reduction of frequency components lying in the high frequency range. In light of this, the illustrative embodiment corrects the response in the high frequency range with the resolution correction 32 so as to prevent the resolution from decreasing. FIG. 11 shows a specific characteristic of the resolution correction 32; the ordinate and abscissa indicate a response and a horizontal frequency, respectively. By using an input high frequency component $Y_{H2}(x)$, a high frequency component $Y_{H2}(x-dx)$ immediately preceding component $Y_{H2}(x)$, and a high frequency component $Y_{H2}(x+dx)$ immediately following the component $Y_{H2}(x)$, the resolution correction 32 generates a high frequency component ($Y_{H3}$) 112 satisfying an equation:

$$Y_{H3}=-0.5Y_{H2}(x-dx)+Y_{H2}(x)-0.5Y_{H2}(x+dx) \qquad (12)$$

Figure 12:
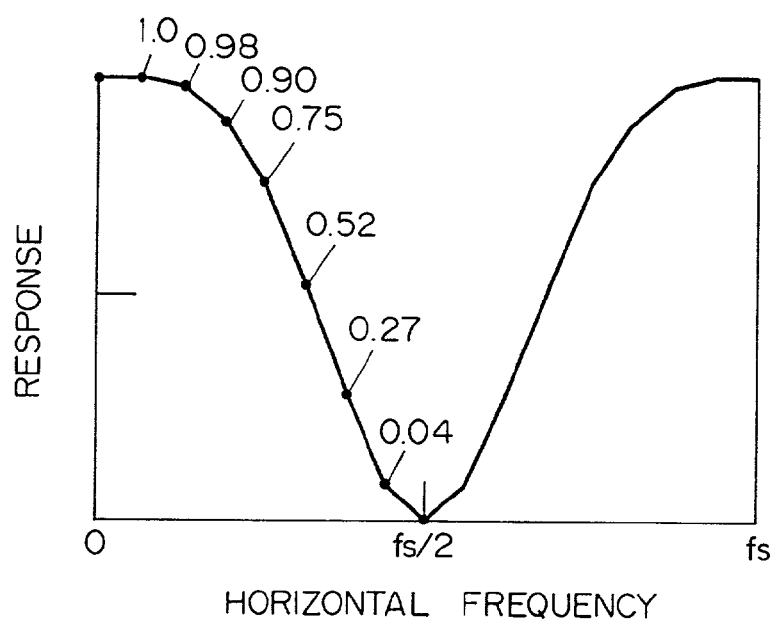
FIG. 12 is a graph showing the total characteristic of the low pass filter having the characteristic of FIG. 10 and resolution correcting section.

The resolution correction 32 is therefore capable of increasing the frequency components of the input signal lying in the high frequency range. This successfully prevents the resolution of an image from falling despite that the high frequency components ($Y_H$) 104 have their frequency components lying in the high frequency range reduced by the LPF 28. FIG. 12 shows the total characteristic of the LPF 28 and resolution correction 32 which is represented by:

$$Y_{H4}=Y_{H2}(x)+0.5Y_{H3}(x) \qquad (13)$$

As stated above, the illustrative embodiment includes the LPF 28 and resolution correction 32 in order to reduce vertical stripes at the diagonal color boundaries of an image while preventing the resolution of the image from falling. In the illustrative embodiment, the LPF 28 and resolution correction 32 each performs filtering or resolution correction by use of three high frequency components corresponding to three pixels adjoining each other in the horizontal direction, thereby minimizing the circuit scale. Alternatively, any other desired number of frequency components may be used so long as the sufficient reduction of false signals and a desired resolution can be implemented.

The high frequency component ($Y_{H1}$) 108 and high frequency component ($Y_{H3}$) 112 output from the LPF 26 and resolution correction 32, respectively, are input to the selector 34. The selector 34 selects either the high frequency component ($Y_{H1}$) 108 or the high frequency component ($Y_{H3}$) 112 in response to a control signal received from the select signal generator 36, and feeds it to the adder 38.

Generally, false signals at a color boundary are conspicuous in some images, but inconspicuous in other images. In addition, the presence of false signals itself is not critical in some images (e.g. text mode images), but critical in other images. In light of this, the selector 34 is controlled to select the high frequency components $(Y_{H1})$ 108 output from the LPF 26 for images in which false signals are inconspicuous, images in which the present of false signals is not critical, and images in which a resolution is more critical than false signals. Also, the selector 34 is controlled to select the high frequency components $(Y_{H3})$ 112 output from the resolution correction 32 for images in which false signals are conspicuous and images in which the presence of false signals is critical.

If desired, which of the high frequency components $(Y_{H1})$ 108 and $(Y_{H3})$ 112 should be selected may be determined pixel by pixel beforehand, in which case the selector 34 will be controlled accordingly. Further, if the image signal processing device 10 deals only with images in which false signals are conspicuous and images in which the presence of false signals is critical, then the LPF 26, selector 34 and select signal generator 36 are omissible.

The high frequency component $(Y_{H4})$ 116 selected by the selector 34 and the luminance signal $(Y_{L1})$ 114 output from the LPF 30 are fed to the adder 38 and added thereby. As a result, the high frequency range of the luminance signal $(Y_{L1})$ 114 is corrected by the high frequency component $(Y_{H4})$ 116. The resulting luminance signal (Y) 118 is fed from the adder 38 to the false signal reduction 40.

The luminance signals (Y) 118 input to the false signal reduction 40 include false signals occurring at horizontal color boundaries. FIG. 13 shows a specific arrangement of filter components of the color filter fitted on the image sensor 12 and lying in the range of the row m−2 through the row m+3 and the column n−3 through the column n+4. Assume that red light and blue light are respectively incident to the upper filter components above a dashed line shown in FIG. 13 and the lower filter components below the dashed line, so that the dashed line forms a horizontal color boundary. Then, the photosensitive elements of the image sensor 12 corresponding to the R filter components above the boundary and the photosensitive elements corresponding to the B filter components below the boundary each generates a color component signal. Such color component signals are output from the image sensor 12.

FIG. 14 shows the arrangement of the color component signals derived from the specific filter component arrangement of FIG. 13 and output from the image sensor 12. In FIG. 14, logical ONES and logical ZEROs respectively show that the image sensor 12 outputs color signal components and that it does not output any color signal component. The color component signals output from the image sensor 12 are subjected to preselected processing at the image processing 14 and then applied to the RGB-YC conversion 20 and line memory 16. The color component signals output from the line memory 16 are fed to the RGB-YC conversion 20 and line memory 18. The resulting color component signals output from the line memory 18 are also input to the RGB-YC conversion 20. The RGB-YC conversion 20 generates the luminance signal $(Y_L)$ 106, high frequency component $(Y_H)$ 104 of the luminance signal $Y_L$ and chrominance signals (R−Y) 100 and (B−Y) 102 for each pixel with the color component signals input thereto.

FIG. 15 shows the high frequency components $(Y_H)$ 104 respectively corresponding to the color component signals shown in FIG. 14. As shown, on the rows m−2, m−1, m+2 and m+3, the high frequency components of the column n−3 column through the column n+4 are respectively "0.5", "0", "0.5", "0", "0.5", "0", "0.5" and "0" and therefore contain no false signals. By contrast, on the rows m and m+1 positioned at the horizontal color boundary, the high frequency components of the column n−3 through the column n+4 are respectively "0.75", "0", "0.25", "0", "0.75", "0", "0.25" and "0"; the high frequency components on the rows n−3, n−1, n+1 and n+3 contain false signals. The high frequency components $(Y_H)$ 104 output from the RGB-YC conversion 20 are input to the LPF 28.

FIG. 16 shows the high frequency components $(Y_{H2})$ 110 output from the LPF 28. As shown, on the rows m−2, m−1, m+2 and m+3, the high frequency components of all of the column n−3 through the column n+4 are "0.25". However, on the rows m and m+1, the high frequency components of the consecutive columns are respectively "0.375", "0.25", "0.125", "0.25", "0.375", "0.25", "0.125" and "0.25". The high frequency components $(Y_{H2})$ 110 are fed to the false signal reduction 40 the resolution correction 32, selector 34, and adder 38.

Figure 17:
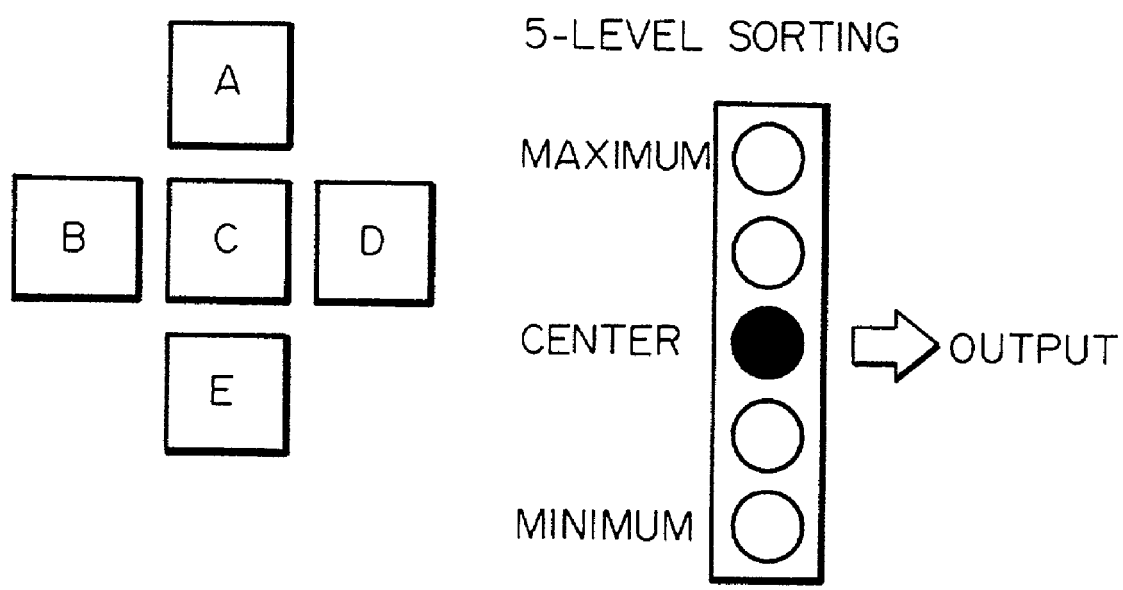
FIG. 17 demonstrates the operation of a median filter included in a false signal reduction shown in FIG. 7.

In the specific configuration of the false signal reduction 40 shown in FIG. 7, a luminance signal 408 output from the adder 38, FIG. 1, (corresponding to the luminance signal (Y) 118 of FIG. 1) is input to the false signal reduction 404. FIG. 17 demonstrates the operation of a median filter included in the false signal reduction 404. As shown, a pixel under observation has a luminance signal C and is surrounded by pixels having luminance signals A, B, D and E, respectively. First, the median filter compares the levels of the luminance signals A-E and then sorts them in order of level. Subsequently, the median filter selects one of the luminance signals A-E corresponding to the center level, substitutes it for the luminance signal C of the pixel under observation, and then outputs the substitute.

When the luminance signal C is a false signal, differences in level between the signal C and the other luminance signals A, B, D and E are greater than differences in level between the signals A, B, D and E. It therefore never occurs that the luminance signal C is determined to be the center value. As a result, the luminance signal or false signal C is replaced with another luminance signal having the center value and omitted thereby. For example, in FIG. 16, all the high frequency components of the consecutive columns on the rows m and m+1 forming the boundary are "0.25". In this manner, false signals at the boundary are successfully omitted by the median filter.

Generally, false signals particular to a horizontal color boundary rarely occur over the entire picture, but occur only locally in a picture. It would therefore waste time to filter the luminance signals of all of the pixels with the median filter. The boundary detection 402, FIG. 7, detects a horizontal color boundary out of the R, G and B component signals 406 output from the image sensor 12. On detecting a horizontal color boundary, the boundary detection 402 commands the false signal reduction 404 to execute filtering with the median filter. In response, the false signal reduction 404 filters the luminance signals appearing at the above boundary with the median filter, but simply outputs the other luminance signals without filtering them.

Figure 18:
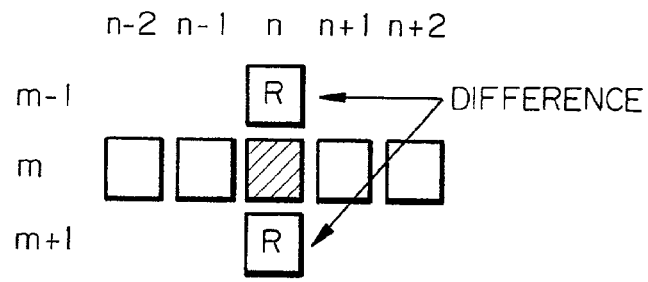
FIGS. 18–21 each shows a particular horizontal color boundary detection scheme available with a horizontal color boundary detecting section shown in FIG, 7.

Reference will be made to FIGS. 18–21 for describing specific horizontal color boundary detection schemes available with the boundary detection 402. In FIG. 18, the detection 402 detects a horizontal color boundary by using the color component signals of two pixels above and below a pixel under observation, e.g., signals $R_{(m-1)n}$ and $R_{(m+1)n}$. Specifically, the detection 402 determines wether or not the following relation (14) holds with respect to a preselected threshold S:

$$D: |R_{(m-1)n} - R_{(m+1)n}| > S \qquad (14)$$

If the relation (14) holds (D=1), then a difference in level between the color component signals $R_{(m-1)n}$ and $R_{(m+1)}$ is greater than the threshold S. Therefore, the detection 402 determines that a horizontal color boundary exists at the position of the pixel under observation.

Figure 19:
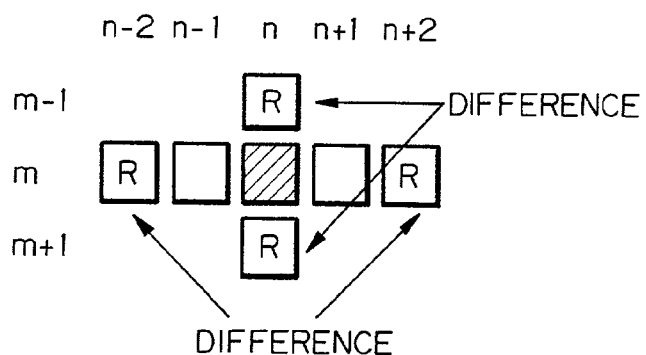

In FIG. 19, the detection 402 detects a horizontal color boundary by using the color component signals of four pixels adjoining a pixel under observation in the vertical and horizontal directions, e.g., signals $R_{(m-1)n}$, $R_{(m+1)n}$, $R_{m(n-2)}$ and $R_{m(n+2)}$. Specifically, the detection 402 determines whether or not the following relations (15) and (16) respectively hold with respect to preselected thresholds $S_V$ and $S_H$:

$$D_V: |R_{(m-1)n} - R_{(m+1)n}| > S_V \quad (15)$$

$$D_H: |R_{m(n-2)} - R_{m(n+2)}| > S_H \quad (16)$$

If the relation (15) holds ($D_V$=1), but the relation (16) does not hold ($D_H$=0), then a difference in level between the color component signals $R_{(m-1)n}$ and $R_{(m+1)n}$ is greater than the threshold $S_V$, so that a horizontal color boundary exists at the position of the pixel under observation. At the same time, because a difference in level between the color component signals $R_{m(n-2)}$ and $R_{m(n+2)}$ is smaller than the threshold $S_H$, the detection 402 determines that a horizontal color boundary does not exist at the position of the pixel under observation.

Figure 20:
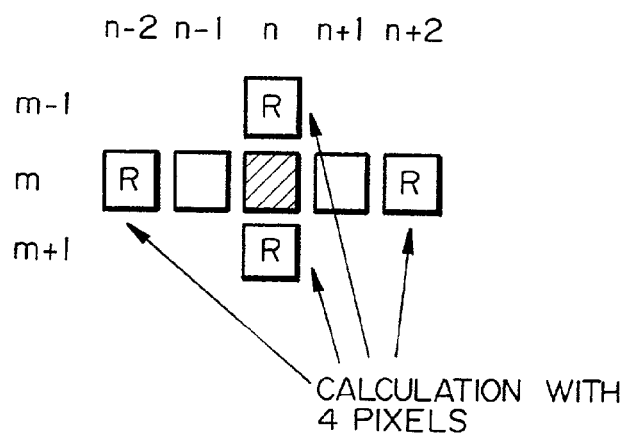

In FIG. 20, the detection 402 also detects a horizontal color boundary by using the color components of four pixels adjoining the pixel under observation in the horizontal and vertical directions, e.g., $R_{(m-1)n}$, $R_{(m+1)n}$, $R_{m(n-2)}$ and $R_{m(n+2)}$. Specifically, the detection 402 determines whether or not the following relation (17) holds with respect to a preselected threshold S:

$$D: |0.5(R_{m(n-2)} + R_{m(n+2)}) - 0.5(R_{(m-1)n} - R_{(m+1)n})| > S \quad (17)$$

If the relation (17) holds (D=1), then the detection 402 determines that only a horizontal color boundary exists at the position of the pixel under observation.

All the methods described with reference to FIGS. 18-20 detect a horizontal color boundary by using a plurality of color component signals of the same color.

Figure 21:
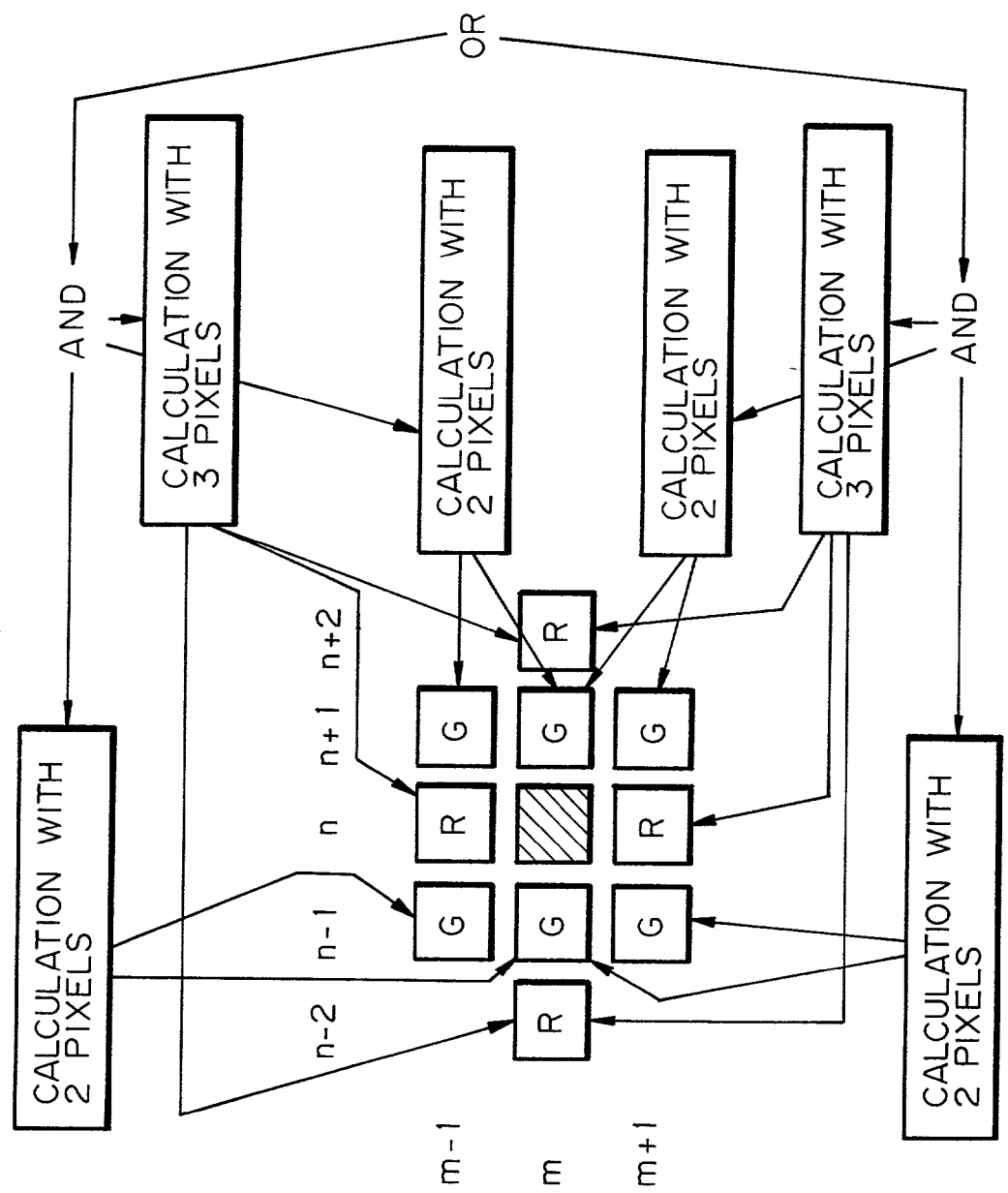

In FIG. 21, the detection 402 detects a horizontal color boundary by using the color component signals of four pixels adjoining a pixel under observation in the horizontal and vertical directions, e.g., $R_{(m-1)n}$, $R_{(m+1)n}$, $R_{m(n-2)}$ and $R_{m(n+2)}$, and the color component signals of six pixels adjoining the pixel under observation in the horizontal direction and diagonal or oblique directions, e.g., signals $G_{(m-1)(n-1)}$, $G_{m(n-1)}$, $G_{(m+1)(n-1)}$, $G_{(m-1)(n+1)}$, $G_{m(n+1)}$ and $G_{(m+1)(n+1)}$. Specifically, the detection 402 determines whether or not the following relations hold:

$$D1: |R_{(m-1)n} - R_{m(n-2)}/2 - R_{m(n+2)}/2| \div (R_{(m-1)n} + R_{m(n-2)}/2 + R_{m(n+2)}/2) \times \text{Gain} \geq \text{Const} \quad (18)$$

$$D2: |G_{(m-1)(n-1)} - G_{m(n-1)}| \div (G_{(m-1)(n-1)} + G_{m(n-1)}) \times \text{Gain} \geq \text{Const} \quad (19)$$

$$D3: |G_{(m-1)(n+1)} - G_{m(n+1)}| \div (G_{(m-1)(n+1)} + G_{m(n+1)}) \times \text{Gain} \geq \text{Const} \quad (20)$$

$$D4: |R_{(m+1)n} - R_{m(n-2)}/2 - R_{m(n+2)}/2| \div (R_{(m+1)n} + R_{m(n-2)}/2 + R_{m(n+2)}/2) \times \text{Gain} \geq \text{Const} \quad (21)$$

$$D5: |G_{(m+1)(n-1)} - G_{m(n-1)}| \div (G_{(m+1)(n-1)} + G_{m(n-1)}) \times \text{Gain} \geq \text{Const} \quad (22)$$

$$D6: |G_{(m+1)(n+1)} - G_{m(n+1)}| \div (G_{(m+1)(n+1)} + G_{m(n+1)}) \times \text{Gain} \geq \text{Const} \quad (23)$$

where Gain denotes a gain coefficient for decision, e.g., "16" while Const denotes a threshold for decision, e.g., "1.0".

Subsequently, the detection 402 determines $D_{mn}$ with a logical equation:

$$D_{mn} = \{(D1 \text{ AND } D2 \text{ AND } D3) \text{ OR } (D4 \text{ AND } D5 \text{ AND } D6)\} \quad (24)$$

If $D_{mn}$=1 holds, then the detection 402 determines that a horizontal color boundary exists at the position of the pixel under observation.

The method shown in FIG. 18 is simplest, but lowers image quality because the detection 402 is apt to detect a color boundary existing in a diagonal direction as a horizontal color boundary. The methods shown in FIGS. 19 and 20 each reduces such an occurrence, but cannot fully obviate erroneous detection because R and B pixels each appears only at every fourth pixel in the G stripe, R/G full checker system. By contrast, the method shown in FIG. 21 detects not only a horizontal color boundary by using R pixels or B pixels, but also a horizontal color boundary by using G pixels which are greater in number than R and B pixels. The method of FIG. 21 can therefore reduce the erroneous detection of diagonal color boundaries, compared to the methods of FIGS. 19 and 20.

In the other specific configuration of the false signal reduction processing 40 shown in FIG. 8, luminance signals 506 output from the adder 38, FIG. 1, (corresponding to the luminance signals (Y) 118 shown in FIG. 1) are applied to the decision 502 and false signal reduction 504. The luminance signal 506 includes false signals occurring at a horizontal color boundary. For example, in FIG. 13, assume that no light is incident to the upper filter components above the dashed line (black portions of a subject) while red light is incident to the lower filter components below the dashed line. Then, the photosensitive elements of the image sensor 12 corresponding to the upper filter components do not generate color component signals while the photosensitive elements corresponding to the R filter components each generates an R component signal. Such R component signals are output from the image sensor 12.

FIG. 22 shows the arrangement of the resulting color component signals output from the image sensor 12. In FIG. 22, ONEs and ZEROs respectively show that the image sensor 12 outputs color signal components and that it does not output any color signal component. The color component signals output from the image sensor 12 are subjected to preselected processing at the image processing 14 and then applied to the RGB-YC conversion 20 and line memory 16. The color component signals output from the line memory 16 are fed to the RGB-YC conversion 20 and line memory 18. The resulting color component signals output from the line memory 18 are also input to the RGB-YC conversion 20. The RGB-YC conversion 20 generates the luminance signal ($Y_L$) 106, high frequency component ($Y_H$) 104 of the luminance signal $Y_L$ and chrominance signals (R-Y) 100 and (B-Y) 102 for each pixel with the color component signals input thereto, as stated earlier.

FIG. 23 shows the high frequency components ($Y_H$) 104 respectively corresponding to the color component signals shown in FIG. 22. As shown, on the rows m−2 and m−1, all the high frequency components of the column n−3 through the column n+4 are "0". The high frequency components of the consecutive columns on the rows m+2 and m+3 are respectively "0.5", "0", "0.5", "0", "0.5", "0", "0.5" and "0" and therefore contain no false signals. By contrast, on the row m, the high frequency components of the consecutive columns are respectively "0", "0", "0.25", "0", "0", "0", "0.25" and "0"; the high frequency components on the columns n−1 and n+3 contain false signals. The high frequency components of the consecutive columns on the row m+1 are respectively "0.25", "0", "0.5", "0", "0.25", "0", "0.5" and "0"; the high frequency components on the columns n−3 and n+1 contain false signals. The high frequency components ($Y_H$) 104 output from the RGB-YC conversion 20 are input to the LPF 28.

Figures 24, 25:
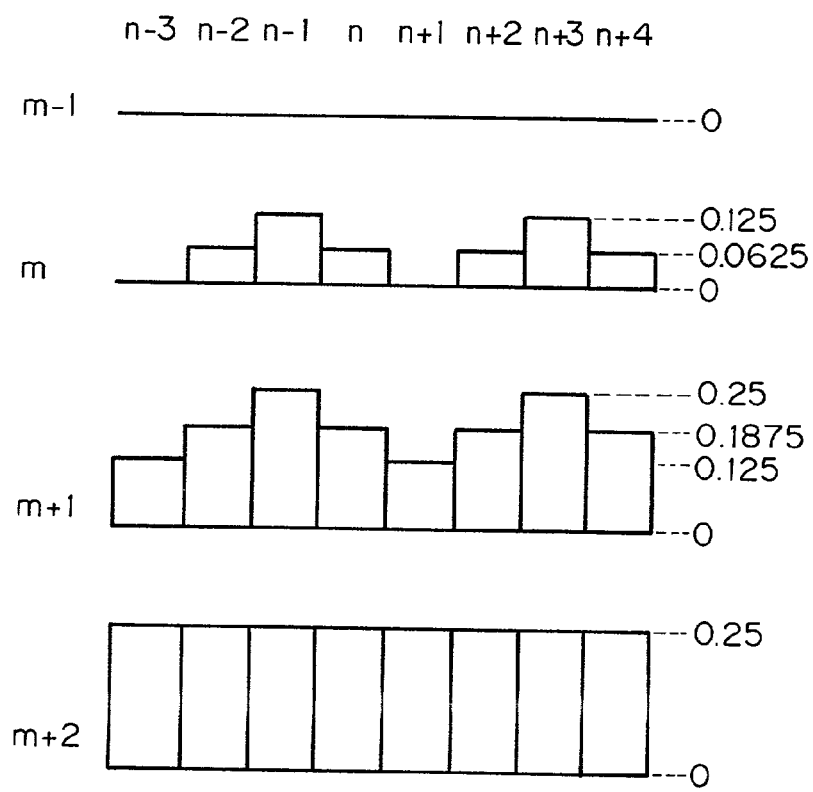
FIG. 24 shows the arrangement of components lying in a high frequency range and output from the low pass filter having the characteristic of FIG. 10 and corresponding to the high frequency components shown in FIG. 23.
FIG. 25 shows the levels of components lying in a high frequency range and appearing on the row m−1 through the row m+2 of FIG. 24.

FIG. 24 shows the high frequency components ($Y_{H2}$) 110 output from the LPF 28. As shown, on the rows m−2 and m−1, all the high frequency components of the consecutive columns are "0". On the rows m+2 and m+3, all the high frequency components of the consecutive rows are "0.25". However, on the row m, the high frequency components of the consecutive columns are respectively "0", "0.0625", "0.125", "0.0625", "0, "0.0625", "0.125" and "0.0625" while, on the row m+1, the high frequency components of the columns are respectively "0.125", "0.1875", "0.25", "0.1875", "0.125, "0.1875", "0.25" and "0.1875". FIG. 25 is a graph showing the levels of the high frequency components of the consecutive columns on the row m−1 through the row m+2; the ordinate indicates the levels. The high frequency components ($Y_{H2}$) 110 are fed to the false signal reduction processing 40 via the resolution correction 32, selector 34, and adder 38.

The decision 502, FIG. 8, determines whether or not the input luminance signals 506 contain false signals appearing at a horizontal color boundary. In FIG. 24, let attention be paid to the luminance signal $Y_{m(n-1)}$ containing a false signal by way of example. The level of the luminance signal $Y_{m(n-1)}$ and the levels of six luminance signals $Y_{m(n-4)}$, $Y_{m(n-3)}$, $Y_{m(n-2)}$, $Y_{mn}$, $Y_{(n+1)}$ and $Y_{m(n+2)}$ adjoining the signal $Y_{m(n-1)}$ in the horizontal direction are related as follows:

$$Y_{m(n-4)} > Y_{m(n-3)} < Y_{m(n-2)} < Y_{m(n-1)} > Y_{mn} > Y_{m(n+1)} < Y_{m(n+2)} \quad (25)$$

The above relation (25) also holds with the luminance signal $Y_{m(n+3)}$ containing a false signal.

Further, in FIG. 24, paying attention to the luminance signal $Y_{(m+1)(n+1)}$ containing a false signal, the level of the signal $Y_{(m+1)(n+1)}$ and the levels of six luminance signals $Y_{(m+1)(n-2)}$, $Y_{(m+1)(n-1)}$, $Y_{(m+1)n}$, $Y_{(m+1)(n+2)}$, $Y_{(m+1)(n+3)}$ and $Y_{(m+1)(n+4)}$ are related as follows:

$$Y_{(m+1)(n-2)} < Y_{(m+1)(n-1)} > Y_{(m+1)n} > Y_{(m+1)(n+1)} < Y_{(m+1)(n+2)} < Y_{(m+1)(n+3)} > Y_{(m+1)(n+4)} \quad (26)$$

The above relation (26) also holds with the luminance signal $Y_{(m+1)(n-3)}$.

Therefore, paying attention to the luminance signal $Y_{mn}$, it can be safely considered that the luminance signal $Y_{mn}$ contains a false signal appearing at a horizontal color boundary, if the luminance signal $Y_{mn}$ and six luminance signals $Y_{m(n-3)}$, $Y_{m(n-2)}$, $Y_{m(n-1)}$, $Y_{m(n+1)}$, $Y_{m(n+2)}$ and $Y_{m(n+3)}$ adjoining it in the horizontal direction satisfy either one of the following relations:

Pattern 1: If $Y_{m(n-3)} > Y_{m(n-2)} < Y_{m(n-1)} < Y_{mn} > Y_{m(n+1)} > Y_{m(n+2)} < Y_{m(n+3)}$, then $P1=1$ (27)

Pattern 2: If $Y_{m(n-3)} < Y_{m(n-2)} > Y_{m(n-1)} > Y_{mn} < Y_{m(n+1)} < Y_{m(n+2)} > Y_{m(n+3)}$, then $P2=1$ (28)

The decision 502 determines whether or not either the relation (27) or the relation (28) holds with the input luminance signal 506. Then, the decision 502 determines that the luminance signal 506 contain a false signal if PAT represented by the following equation is a logical ONE:

PAT=P1 OR P2 (29)

In this manner, if a pattern representative of a relation between the levels of a luminance signals is specified beforehand, it is possible to detect a luminance signal containing a horizontal color boundary by detecting the pattern. To detect a luminance signal containing a false signal without any error, it is preferable to detect it by using six or more luminance signals adjoining the luminance signal under observation in the horizontal direction, i.e., seven or more luminance signals in total.

However, the problem is that the relations (27) and (28) may hold even with a vertical stripe pattern, In such a case, luminance signals belonging to vertical stripes would be determined to be luminance signals containing false signals and would be filtered out by the median filter stated previously. As a result, the stripe pattern would be deleted. To solve this problem, the decision 502 determines whether or not the input luminance signals 506 belong to vertical lines and prevents, if the answer of the decision is positive, the false signal reduction 504 from executing filtering with the median filter.

To determine whether or not the luminance signal $Y_{mn}$ belongs to a vertical line, the decision 502 uses the horizontal frequency component of the luminance signal $Y_{mn}$ and the horizontal frequency components of two luminance signals $Y_{(m-1)n}$ and $Y_{(m+1)n}$ adjoining the luminance signal $Y_{mn}$ in the vertical direction. Specifically, by using the luminance signal $Y_{mn}$ under observation and the adjoining luminance signals $Y_{m(n-1)}$ and $Y_{m(n+1)}$, the decision 502 calculates HPF1:

$$HPF1=(-Y_{m(n-1)}+2Y_{mn}-Y_{m(n+1)}) \div 2 \quad (30)$$

Also, by using the luminance signals $Y_{(m-1)n}$ and $Y_{(m+1)n}$, the decision 502 calculates HPF2 and HPF3:

$$HPF2=(-Y_{(m-1)(n-1)}+2Y_{(m-1)n}-Y_{(m-1)(n+1)}) \div 2 \quad (31)$$

$$HPF3=(-Y_{(m+1)(n-1)}+2Y_{(m+1)n}-Y_{(m+1)(n+1)}) \div 2 \quad (32)$$

Subsequently, the decision 502 compares the HPF1, HPF2 and HPF3 with a preselected threshold MDS by using conditions:

If $MDS > HPF1 > -MDS$, then $S1=1$ (33)

If $MDS > HPF2 > -MDS$, then $S2=1$ (34)

If $MDS > HPF3 > -MDS$, then $S3=1$ (35)

The decision 502 produces an AND TAT of the results of comparison S1, S2 and S3 by using an equation:

TAT=S1 AND S2 AND S3 (36)

The decision 502 determines that the luminance signal $Y_{mn}$ belongs to a vertical line if TAT is a logical ZERO, or that the signal $Y_{mn}$ does not belong to a vertical line if TAT is a logical ONE.

Subsequently, the decision 502 produces an AND SEL of PAT and TAT respectively derived from the equations (29) and (36) by using an equation:

SEL=PAT AND TAT (37)

If SEL is a ONE, then the decision 502 determines that the luminance signal under observation contains a false signal appearing at a horizontal color boundary and does not belong to a vertical line. If SEL is a ZERO, then the decision 502 determines that the luminance signal under observation is either one of a luminance signal free from a false signal to appear at a horizontal color boundary and a luminance signal belonging to a vertical line.

Figure 26:
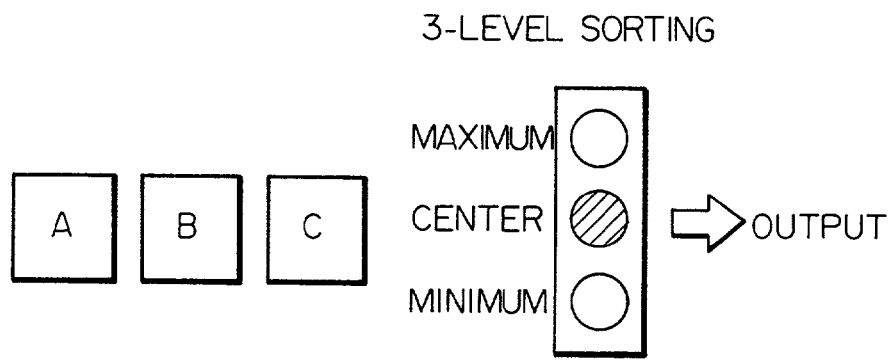
FIG. 26 demonstrates the operation of a median filter included in a false signal reduction shown in FIG. 8.

The decision 502 causes the false signal reduction 504 to filter the luminance signals 506 with the median filter when SEL is a ONE, but prevents it from filtering the signals 506 when SEL is a ZERO. The median filter is a three-pixel median filter. As shown in FIG. 26, assume a luminance signal B particular to a pixel under observation, and luminance signals A and C respectively particular to pixels adjoining the above pixel in the horizontal direction. Then, the median filter compares the levels of the luminance signals A-C and then sorts them in order of level. Subsequently, the median filter selects the luminance signal corresponding to the center value, substitutes it for the luminance signal B of the pixel being observed, and then outputs the substitute.

Figure 27:
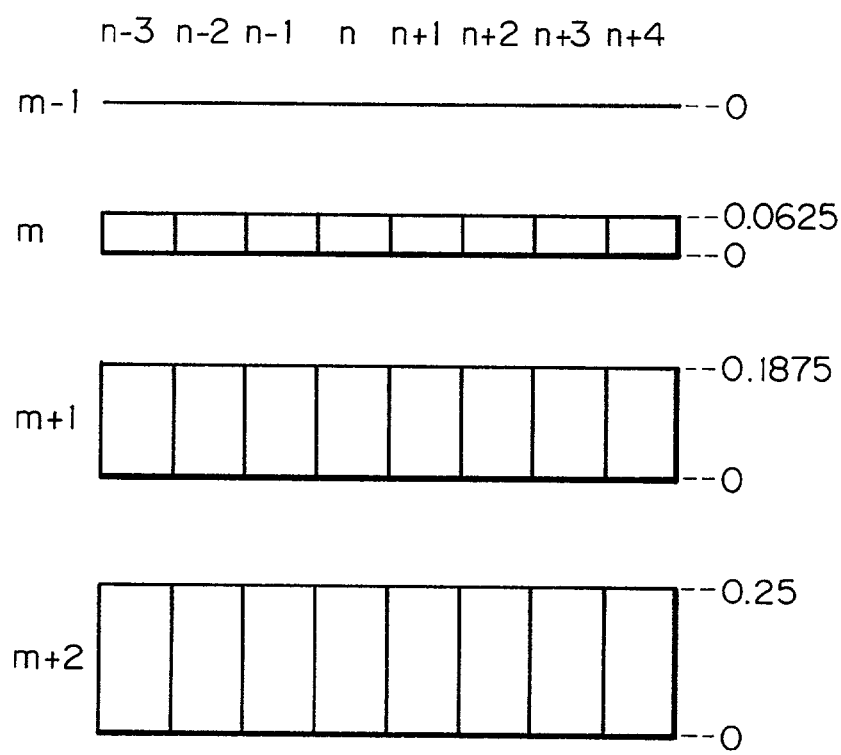
FIG. 27 shows luminance signals output from the false signal reduction of FIG. 8 and corresponding to the high frequency components shown in FIG. 25.

FIGS. 27 show the levels of signals output from the false signal reduction 504. Assume that the high frequency components shown in FIG. 25 are input to the false signal reduction 504. Then, as for the signals on the rows m and m+1 at the horizontal color boundary and the columns n−3, n−1, n+1 and n+3, SEL is a ONE. Therefore, the reduction 504 filters the signals with the median filter. However, as for the signals on the other columns, SEL is a ZERO, so that the reduction 504 simply Outputs them without filtering them. Consequently, the level of the signals output from the reduction 504 are "0.0625" on the row m and "0.1875" on the row m+1, i.e., false signals at the horizontal color boundary are reduced on every row.

The luminance signals 120 having false signals thereof reduced by the false signal reduction processing 40 are input to the contour correction 42 and have their contour enhanced.

In summary, in accordance with the present invention, an image signal processing device includes an LPF for reducing frequency components lying in the high frequency range of the components $Y_H$ of luminance signals, and a resolution correcting section for raising the above frequency components. The device can therefore reduce false signals appearing at the diagonal color boundaries of the high frequency components $Y_H$ without deteriorating resolution. In addition, the device is capable of reducing false signals appearing at horizontal color boundaries with a false signal reducing section including a median filter.

The entire disclosure of Japanese patent application Nos. 93595/1997 filed on Apr. 11, 1997 and 71812/1998 filed on Mar. 20, 1998 and including the specifications, claims, accompanying drawings and abstracts of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An image signal processing device including a solid imaging device on which a G stripe, R/B full checker color filter is fitted, said image signal processing device comprising:
    a generating circuit for generating, based on color component signals output from said solid imaging device, first luminance signals and components of said first luminance signals lying in a high frequency range;
    a low pass filter (LPF) for reducing high frequency components of said components lying in a high frequency range and output from said generating circuit to thereby output reduced high frequency components;
    a resolution correcting circuit for increasing high frequency components of said reduced high frequency components to thereby output increased high frequency components; and
    an adder for adding said increased high frequency components and said first luminance signals to thereby output second luminance signals.

2. A device in accordance with claim 1, wherein said LPF adds the component input and two components immediately preceding and immediately following said component, respectively.

3. A device in accordance with claim 1, wherein said resolution correcting circuit subtracts from the component input a mean value or two components immediately preceding and immediately following said component, respectively.

4. A device in accordance with claim 1, further comprising a false signal reduction processing circuit for reducing false signals appearing at horizontal color boundaries and contained in said second luminance signals.

5. A device in accordance with claim 4, wherein said false signal reduction processing circuit comprises:
    a horizontal color boundary detecting circuit for determining, based on the color component signals output from said solid imaging device, whether or not the second luminance signal belong to a horizontal color boundary; and
    a false signal reducing circuit for filtering the second luminance signal with a median filter if said second luminance signal belongs to a horizontal color boundary, as determined by said horizontal color boundary detecting circuit, or simply outputting said second luminance signal if said second luminance signal does not belong to a horizontal color boundary.

* * * * *